No. 693,537. Patented Feb. 18, 1902.
E. BATAULT.
ALTERNATING CURRENT ELECTRIC METER.
(Application filed Mar. 15, 1901.)
(No Model.)
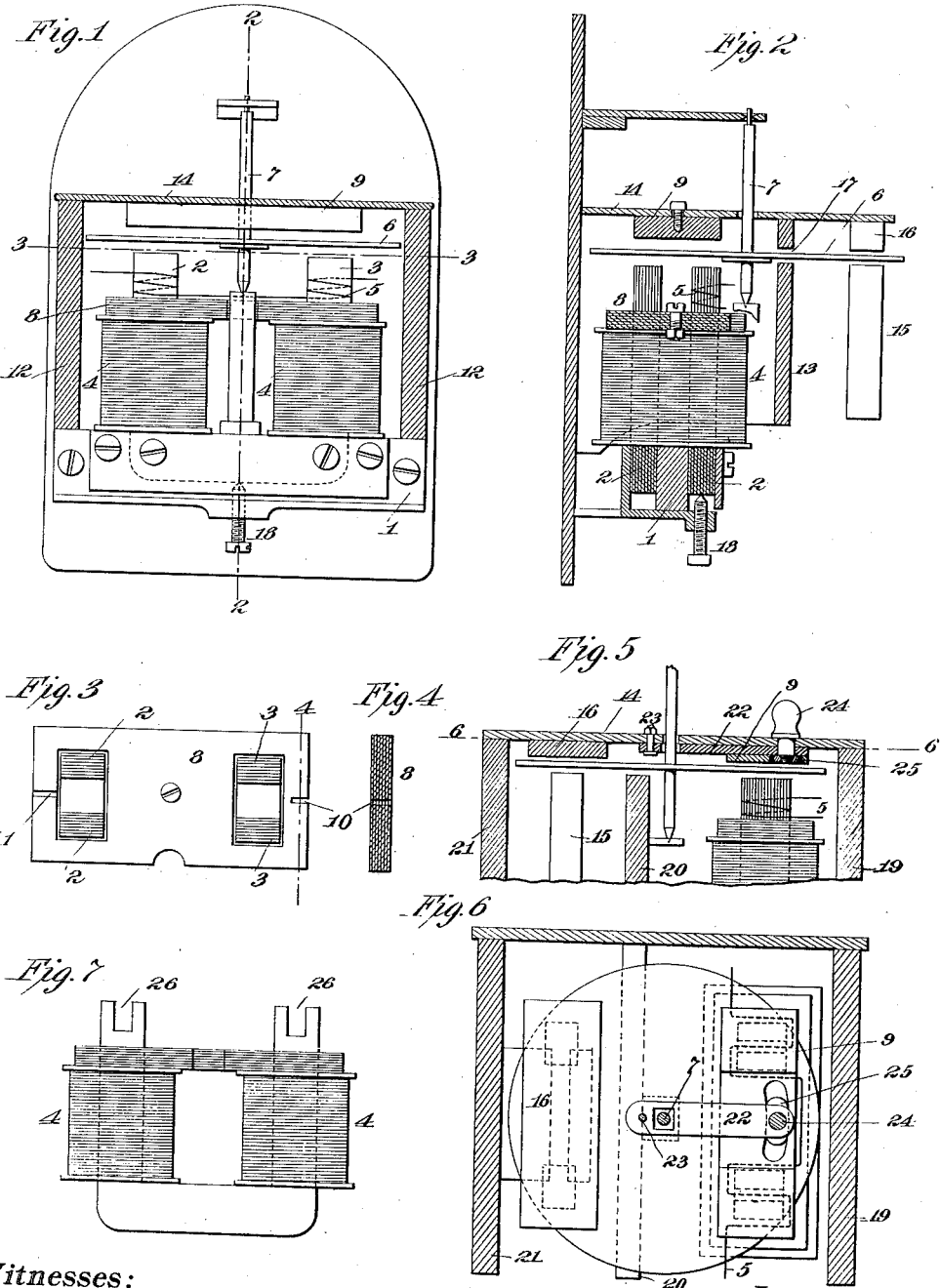
Witnesses:
Jas. F. Coleman
Jno. R. Taylor
Inventor
Emile Batault
by Dyer Edmonds & Dyer
Att'ys.

UNITED STATES PATENT OFFICE.

EMILE BATAULT, OF GENEVA, SWITZERLAND.

ALTERNATING-CURRENT ELECTRIC METER.

SPECIFICATION forming part of Letters Patent No. 693,537, dated February 18, 1902.

Application filed March 15, 1901. Serial No. 51,229. (No model.)

*To all whom it may concern:*

Be it known that I, EMILE BATAULT, a citizen of the Swiss Republic, residing at Geneva, in the canton of Geneva, Republic of Switzerland, have invented a certain new and useful Improvement in Alternating-Current Electric Meters, of which the following is a specification.

My invention relates to improvements in alternating-current meters and electrical measuring instruments of similar character, and particularly to the class of meters wherein a register is actuated by a rotating body or armature movement of which is effected by the resultant field produced by two magnetic fields differing in phase, one of said fields being due to and varying with the current in the work-circuit and the other field being due to and varying with the electrical pressure. In my Patent No. 652,453, dated June 26, 1900, I show a meter of this type using a disk armature rotating in a plane closely adjacent to two magnetic poles each carrying a shunt-coil, and one or both of said poles being provided with one or two series coils for inducing in the armature magnetic fields differing in phase and eccentric to the fields induced by the shunt-coils, to thereby effect rotation of the armature. The Foucault currents thus induced in the armature produce a checking or braking effect, which in the measurement of currents of substantantially constant electromotive force can alone be relied upon to oppose the rotative tendency and to effect a proper registration. When, however, the electromotive force is subject to variation, I make use of a separate permanent magnet, as described in said patent, to secure a constant checking or braking effect which shall be independent of any variations in the voltage. When such a permanent magnet is used for the purpose mentioned, it will be evident that the checking or braking effect imposed upon the armature will be due to two factors—namely, the magnetic retardation imposed by the permanent magnet and the generation of Foucault currents by induction—and since, as stated, the latter factor is a variable one, changing with changes in voltage, a corresponding error in the registration will result, and the meter will register disproportionately greater or fewer watts as the voltage falls or rises. In order that this error may be practically minimized, I find it necessary, in the construction of a meter for the purpose indicated, to depend upon the permanent magnet for the greater bulk of the braking effect. If, for example, fifty per cent. of the braking or checking effect is due to the permanent magnet and fifty per cent. to the inductive effect of the coils, a variation of fifty per cent. in the latter effect would result in an error of twenty-five per cent. in the total checking or braking action; but if ninety per cent. of the braking or checking effect is due to the permanent magnet and ten per cent. to the effect of induction a similar variation in the latter effect will result only in a variation of five per cent. in the entire braking or checking action. In order to secure this result, I employ between the two branches of the shunt-magnet a magnetic bridge or diverter made, for example, of laminated iron, and by means of which will be secured a partial closing of the magnetic lines of force below the armature, so as to diminish in consequence the number of magnetic lines of force which affect the armature. This magnetic bridge or diverter is placed between the shunt-coils and the revolving armature and preferably below the series coils, so that the action of the magnetic field in the armature produced by the latter coils will not be weakened, but will be rather strengthened. It is also possible to so arrange the magnetic diverter that it will perform the additional function of the closed short-circuit windings referred to in my said patent and by means of which I overcome an error noted when used on highly-inductive circuits.

My objects, generally, are to carry out these ideas in a simple and economical manner, as well as to improve and simplify the details of construction, all as will be hereinafter described and claimed.

In order that the improvements may be better understood, attention is directed to the accompanying drawings, forming a part of this specification, and in which—

Figure 1 is a front elevation, partly in section; Fig. 2, a section on the line 2 2 of Fig.

1; Fig. 3, a section on the line 3 3 of Fig. 1; Fig. 4, a section on the line 4 4 of Fig. 3; Fig. 5, a longitudinal section illustrating a modification; Fig. 6, a section on the line 6 6 of Fig. 5, and Fig. 7 a section showing a modified form of operating-magnet.

In all of the above views corresponding parts are represented by the same numerals of reference.

Referring first to Figs. 1, 2, 3, and 4, the main operating-magnet is shown as being formed of a yoke 1, the two legs of which are formed of laminated metal 2 2 and 3 3, secured on opposite sides of the yoke and each pair of legs receiving a shunt-coil 4 4, both of said coils being preferably in series with each other and being connected across the line. One or both of the sections of each of the legs of the magnet may be provided with a series coil 5, as shown, which coil or coils may be arranged in any suitable way, as suggested in said patent, and which are in series with the work-circuit, so as to be influenced by the current to be measured. Mounted above the poles of the magnet is a disk armature 6, carried on a vertical shaft 7, which shaft is connected with a register. (Not shown.) Mounted, preferably, between the shunt-coils 4 and the series coils 5 is a magnetic bridge or diverter 8, formed, preferably, of iron plates having openings through which the poles extend, as shown. These openings may be larger than is necessary to receive the pole-pieces, so that free spaces will be formed between the poles and the adjacent surface of the bridge or diverter. This distance between the cores of the magnet and the bridge may vary, which factor determines the amount of lines of force which may be diverted through the bridge and from the armature, it being obvious that when the bridge or diverter is close to the cores less lines of force will be permitted to pass through the armature to act upon it than is otherwise the case. This free space is determined by experiment in order that the meter may give proper indications, not only under changes in the voltage, but also under changes in the periodicity of the alternating-current influencing the coils. With this construction each of the iron plates comprising the bridge or diverter completely surrounds each core and constitutes, in practice, a closed short-circuit winding around the core, corresponding closely in construction and operation with the short-circuit windings referred to in my said patent. The number of plates employed in the construction of the bridge or diverter varies according to their thickness and to the complete section that is desired to secure the proper results. Normally this complete section may be smaller than the section of one core, as a certain number of the lines of force produced in the shunt-cores are not derived through the bridge, but pass through the rotating armature 6 to the stationary armature 9 on the other side thereof, the latter corresponding to the corresponding stationary armature of my patent. If according to the number of the plates the total section inclosing the cores is too large to secure the desired result, the plates may be as a whole partly cut through at one end at 10, or some of the plates may be wholly cut through at one end, as at 11, to reduce the effect.

It will be of course understood that instead of inclosing the cores entirely by sections of the diverter or bridge, as explained, separate short-circuit windings may be employed, as described in said patent, when necessary, in which latter case the magnetic bridge or diverter may extend in the space between the two cores, as will be understood, so as to perform the single function of diverting a part of the lines of force therefrom.

In meters for alternating currents having a permanent magnet for effecting a constant braking or checking action on the disk-armature it frequently happens that a short circuit in the meter tends to weaken the magnet, and thereby change its normal standard. To avoid this difficulty, I described in my patent a movable armature acting in connection with the permanent magnet to divert a part of the lines of force and to be automatically retracted as the magnet became weakened. Instead of this expedient, or even in addition to it, I prefer to isolate the permanent magnet from the shunt-coils and to inclose the latter in an iron casing, so as to screen the permanent magnet from the alternating fields due to the current passing normally through the meter and from the magnetic and inductive effects due to abnormal disturbances in the shunt or series coils. To this end, I make use of an iron casing having sides 12 12, a front 13, and a top 14, which incloses the coils and actuating-magnet, and the top 14 may conveniently carry the stationary armature 9, as shown. The permanent magnet 15, with its armature 16, is located outside of this casing, as shown, and the magnet acts on that portion of the disk armature 6 which extends through a slit 17 in the front wall 13. In this construction, in order that a prohibitively-large diameter of disk armature may not be necessary, I pivot the same to one side of the operating-magnet, which, therefore, instead of working in line with a diameter of the armature, is disposed in line with a chord extending parallel to the diameter. With this arrangement also the speed of rotation of the disk armature will be diminished, since the impelling forces induced therein act practically on a smaller leverage. With the construction described, wherein the coils are entirely concealed in a casing and wherein the permanent magnet is arranged outside of the casing, it is impossible to note the position of the poles with respect to the armature when the two are adjusted relatively by means of an adjusting-screw 18, and it is also impossible to protect the permanent magnet from outside influences except by the external cover of the meter. I therefore prefer to use the modification shown in Figs. 5 and 6, wherein the operating-magnet is arranged between two iron walls 19 and 20, the disk armature projecting through the latter wall, and wherein the permanent magnet is arranged between the wall 20 and an iron wall 21, as shown. In this way I secure two separate cells or boxes—one for the electromagnetic motor and the other for the permanent magnet, the latter being protected both from influences within the motor and from outside influences, while at the same time it will be possible to examine the motor or permanent magnet by merely removing the outside cover of the meter.

With the form of device shown in Figs. 1, 2, 3, and 4 the stationary armature 9 is centrally pivoted, as I describe in my said patent, whereby the starting torque of the motor can be regulated by changing the position of said armature, due, probably, to the fact that the lines of force established by the shunt-coils pass them obliquely through the rotating armature to reach the pivoted armature 9 and in so doing produce a distortion of the field acting upon the movable armature.

With the form of device shown in Figs. 5 and 6 the armature 9 is not pivoted, but a supplemental or auxiliary controlling-armature 22 is made use of, the latter being pivoted at 23 and being operated by a thumb-piece 24, carrying at its lower end a small iron block 25, forming practically a part of armature 22, working in an opening or slot in the armature 9, as shown. By shifting the position of the auxiliary armature 22 the same effect will be secured as when the armature 9 is pivotally mounted, as explained in said patent.

Instead of making use of a main operating-magnet, as explained, comprising two separate laminated leg-sections the cores and yoke may be constructed of separate stamped sheets of the form shown in Fig. 7, each sheet having a cut-away portion 26, forming separate poles around which the series coils are wound.

Having now described my invention, what I claim as new, and desire to secure by Letters Patent, is as follows:

1. In an electric meter of the type described, the combination with an actuating-magnet, a rotating armature and a permanent retarding or brake magnet, of a magnetic bridge or diverter extending between the cores of the actuating-magnet, substantially as and for the purposes set forth.

2. In an electric meter of the type described, the combination with an actuating-magnet, a rotating armature and a permanent retarding or brake magnet, of a magnetic bridge or diverter extending between and inclosing the cores of the actuating-magnet, substantially as and for the purposes set forth.

3. In an electric meter of the type described, the combination with an actuating-magnet, a rotating armature and a permanent retarding or brake magnet, of a magnetic bridge or diverter extending between and inclosing the cores of the actuating-magnet and with free air-spaces surrounding said cores, substantially as and for the purposes set forth.

4. In a meter of the type described, the combination with the actuating-magnet having divided or split cores, shunt-coils on said cores, series coils on one or more of the split portions of said cores, and a rotating armature, of a magnetic bridge or diverter extending between said cores, substantially as set forth.

5. In a meter of the type described, the combination with the actuating-magnet having divided or split cores, shunt-coils on said cores, series coils on one or more of the split portions of said cores, and a rotating armature, of a magnetic bridge or diverter extending between said cores between the shunt and series coils, substantially as set forth.

6. In a meter of the type described, the combination with the actuating-magnet having divided or split cores, shunt-coils on said cores, series coils on one or more of the split portions of said cores, and a rotating armature, of a magnetic bridge or diverter extending between said cores and inclosing the same, substantially as set forth.

7. In a meter of the type described, the combination with the actuating-magnet, shunt and series coils thereon, and an armature, of a magnetic bridge or diverter extending between and inclosing said cores, said bridge or diverter being cut away to reduce its inductive capacity, substantially as set forth.

8. In a meter of the type described, the combination with the actuating-magnet, shunt and series coils thereon, and a disk armature pivotally mounted at one side of said magnet, of a metal shield inclosing the magnet and having a slit through which the disk armature extends, and a permanent magnet coöperating with the disk armature outside of said shield, said shield being open-sided to permit inspection of the armature and magnet, substantially as set forth.

9. In a meter of the type described, the combination with the actuating-magnet, shunt and series coils thereon, and a disk armature pivotally mounted at one side of said magnet, of a metal shield inclosing the magnet and having a slit through which the disk armature extends, a permanent magnet coöperating with the disk armature outside of said shield, and a metallic shield on the other side of said permanent magnet for protecting the same from outside influences, substantially as set forth.

10. In a meter of the type described, the combination with an actuating-magnet, shunt and series coils thereon, and an armature cooperating with said magnet, of a stationary armature on the opposite side of said rotating armature, and a supplemental or auxiliary armature adjustable with respect to the stationary armature, substantially as set forth.

This specification signed and witnessed this 28th day of February, 1901.

EMILE BATAULT.

Witnesses:
HORACE LEE WASHINGTON,
L. H. MUNIER.